United States Patent
Nomura et al.

(10) Patent No.: US 7,352,600 B2
(45) Date of Patent: Apr. 1, 2008

(54) ELECTRIC POWER UNIT

(75) Inventors: Fujio Nomura, Kawasaki (JP); Hiroshi Iwanaga, Yokohama (JP); Masayasu Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/297,454

(22) Filed: Dec. 9, 2005

(65) Prior Publication Data

US 2006/0133119 A1    Jun. 22, 2006

(30) Foreign Application Priority Data

Dec. 21, 2004   (JP)   ............................. 2004-369852

(51) Int. Cl.
    *H02M 3/335*    (2006.01)
    *H20M 7/5387*    (2006.01)

(52) U.S. Cl. ...................................... 363/98

(58) Field of Classification Search ............ 363/15–17, 363/65, 71, 97, 98, 131, 132; 323/272
See application file for complete search history.

(56) References Cited

U.S. PATENT DOCUMENTS

| | | | | |
|---|---|---|---|---|
| 5,541,827 A | * | 7/1996 | Allfather | .................... 363/17 |
| 5,768,112 A | * | 6/1998 | Barrett | ........................ 363/16 |
| 6,185,111 B1 | * | 2/2001 | Yoshida | ...................... 363/17 |
| 6,567,285 B2 | * | 5/2003 | Cho et al. | .................. 363/132 |
| 6,590,791 B1 | | 7/2003 | Zhou et al. | |
| 6,728,118 B1 | | 4/2004 | Chen et al. | |
| 7,009,850 B2 | * | 3/2006 | Jitaru | .......................... 363/17 |

FOREIGN PATENT DOCUMENTS

JP   7-337034   12/1995

* cited by examiner

*Primary Examiner*—Gary L. Laxton
(74) *Attorney, Agent, or Firm*—Oblon, Spivak, McClelland, Maier & Neustadt, P.C.

(57) ABSTRACT

There is no period of time when any of switching elements and switching elements is turned on in a certain switching frequency, any one switching element is turned on in a period of time except for a dead time period for the zero voltage switching, the switching elements and the switching elements are turned on and off while shifting the phases by 180 degrees, and switching elements are turned on during a period of time when the currents in a positive direction and an inverse direction are flowing to the output, respectively, to be operated in a discontinuous current mode.

2 Claims, 5 Drawing Sheets

ELECTRIC POWER UNIT

CROSS-REFERENCE TO RELATED APPLICATIONS

This application is based upon and claims the benefit of priority from prior Japanese Patent Application No. 2004-369852, filed Dec. 21, 2004, the entire contents of which are incorporated herein by reference.

BACKGROUND OF THE INVENTION

1. Field of the Invention

The present invention relates to an electric power unit for use in a low voltage and high current device, for example, a radar device and a CPU (central processing unit) of a computer.

2. Description of the Related Art

As is well known, according to a conventional insulated electric power unit using a transformer, in order to improve efficiency, a synchronous rectifier converter using a switching element such as an FET (field effect transistor) at its secondary side is employed. However, such a conventional system has a disadvantage such that a recovery loss due to a recovery current flowing through a body diode is large and it is difficult to obtain a high frequency.

In other words, in the case of a normal forward converter, a slope of a current at a flywheel side is found by $$-n \cdot Vin/Lr$$

where an input voltage is Vin, a turn ratio between a primary side and the secondary side is 1:n, and a leakage inductance at the secondary side of a transformer is Lr. That is, this slope of the current is proportional to the input voltage Vin and becomes very large because the normal inductance Lr is very small, and as a result, the recovery current depending on this slope of the current becomes very high.

In addition, in order to ensure a withstand pressure of the FET, an FET with a high on resistance must be used and this leads to lowering of an efficiency. In other words, in the case of the normal forward converter, the voltage applied to the side of the flywheel side is found by $$n \cdot Vin$$

where the input voltage is Vin, and the turn ratio between the primary side and the secondary side is 1:n. That is, this voltage is proportional to the input voltage Vin and in consideration of the fact that a surge voltage is further added to this voltage, the FET having a high withstand pressure is needed.

In Jpn. Pat. Appln. KOKAI Publication No. 7-337034, an art is disclosed, in which an output capacity of a MOSFET and a leakage inductance of an electric transformer are resonated, so that the need of providing an external capacitor for resonation and a reactor is cut out and then downsize the converter and the switching loss is prevented from being increased even if a switching frequency is made high by carrying out the zero-voltage switching.

BRIEF SUMMARY OF THE INVENTION

The present invention has been made taking the foregoing problems into consideration and an object of which is to provide an electric power unit, that can make a slope of a current very small, can suppress a withstand pressure of a switching element lower, and of which high frequency and downsizing can be easily realized.

According to one aspect of the present invention, there is provided an electric power unit comprising: a first switching element having one end to which one level of a direct current voltage is applied; a second switching element having one end connected to the other end of the first switching element and having the other end to which the other level of the direct current voltage is applied; a third switching element having one end to which one level of the direct current voltage is applied; a fourth switching element having one end connected to the other end of the third switching element and having the other end connected to the other end of the second switching element, the other level of the direct current being applied to the other end; a first capacitor connected to any one of the first and second switching elements in parallel; a second capacitor connected to any one of the third and fourth switching elements in parallel in accordance with the first capacitor; a first coil having one end connected to a connection point of the first and second switching elements; a transformer having a primary coil connected between the other end of the first coil and the connection point of the third and fourth switching elements; fifth and sixth switching elements connected in series between the both ends of a secondary coil of the transformer; a third capacitor connected between a middle tap point of the secondary coil of the transformer and the connection point of the fifth and sixth switching elements; and a control section which controls the first to sixth switching elements on the basis of the output voltage between the both ends of the third capacitor, wherein there is no period of time when any of the first and second switching elements and the third and fourth switching elements is turned on in a certain switching frequency, any one switching element is turned on in a period of time except for a dead time period for the zero voltage switching, the first and third switching elements and the second and fourth switching elements are turned on and off while shifting the phases by 180 degrees, and the fifth and sixth switching elements are turned on during a period of time when the currents in a positive direction and an inverse direction are flowing to the output, respectively, and to be operated in a discontinuous current mode.

DETAILED DESCRIPTION OF THE INVENTION

Figure 1:
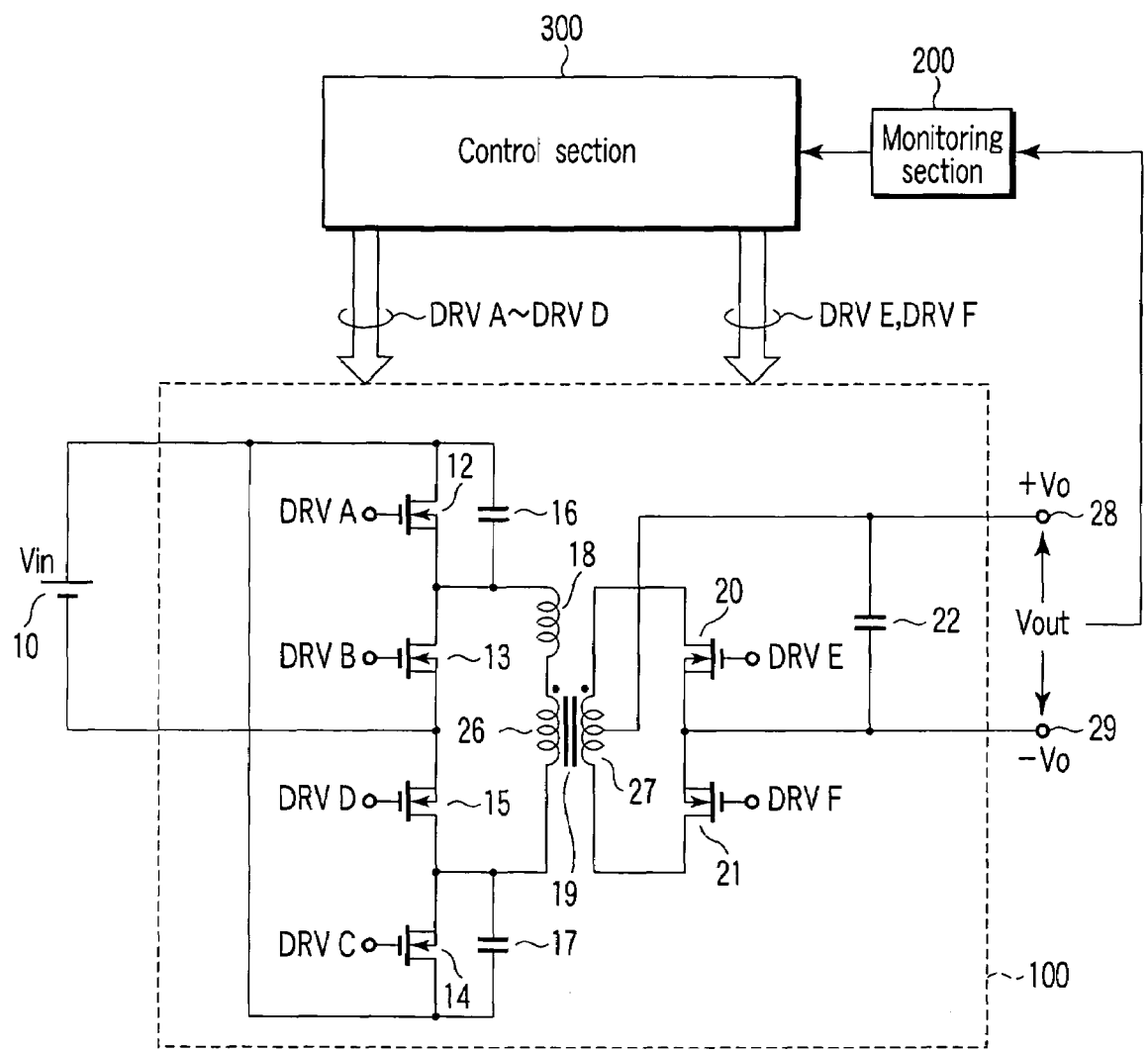
FIG. 1 is a block diagram showing an embodiment of the present invention and illustrating details of a DC-DC converter.

An embodiment of the present invention will be described in detail below with reference to the drawings. In FIG. 1, to a DC-DC converter (100), a direct current voltage Vin is supplied from a voltage source (10). In other words, a positive electrode (+) of this voltage source (10) is connected to one end portion of a switching element (12), for example, an FET.

The other end portion of this switching element (12) is connected to one end portion of a switching element (13), for example, an FET, and one end portion of a coil (18). In the meantime, to this switching element (12), a capacitor (16) is connected in parallel.

The positive electrode (+) of the voltage source (10) is connected to one end portion of a switching element (14), for example, an FET. The other end portion of this switching element (14) is connected to one end portion of a switching element (15), for example, an FET, and one end portion of a primary coil (26) of a transformer (19).

Each of the other end portions of the switching elements (13, 15) is connected to each other and its common connection point is connected to the negative electrode (−) of the voltage source (10). The other end portion of the coil (18) mentioned above is connected to the other end portion of a primary coil (26) of the transformer (19). In the meantime, to this switching element (14), a capacitor (17) is connected in parallel.

One end portion of a secondary coil (27) of the transformer (19) is connected to one end portion of a switching element (20), for example, an FET. The other end portion of a secondary coil (27) of the transformer (19) is connected to one end portion of a switching element (21), for example, an FET.

Then, a middle tap point of the secondary coil (27) of the transformer (19) is connected to one output terminal (28). Each of the other end portions of the switching elements (20, 21) is connected to each other and its common connection point is further connected to the other output terminal (29). Further, a capacitor (22) is connected between these output terminals (28, 29).

The output voltage Vout obtained between respective output terminals (28, 29) is detected by a monitoring section (200). This monitoring section (200) generates a feedback signal corresponding to this detection result and outputs this feedback signal to a control section (300).

This control section (300) generates drive signals DRV A to DRV D of the switching elements (12 to 15) and drive signals DRV E and DRV F of the switching elements (20, 21) by performing a pulse width modulation (PWM), a pulse frequency modulation (PFM) or a phase modulation on the basis of the feedback signal inputted.

When each of switching elements (12 to 15, 20, 21) is switching-controlled by these drive signals DRV A to DRV F, the feedback control is carried out so that the output voltage Vout is stabilized.

However, in the case of the phase modulation, the capacitor (16) is connected to the both ends of the switching element (15).

The coil (18) includes a leakage inductance of the transformer (19) and even if the coil (18) is configured only by the leakage inductance, the same effect can be obtained.

Further, the capacitor (16) includes parasitic capacitances of the switching elements (12, 13) and the transformer (19) and even if the capacitor (16) is configured only by the parasitic capacitance of the switching elements (12, 13) and the transformer (19), the same effect can be obtained.

In addition, the capacitor (17) includes parasitic capacitances of the switching elements (14, 15) and the transformer (19) and even if the capacitor (17) is configured only by the parasitic capacitance of the switching elements (14, 15) and the transformer (19), the same effect can be obtained.

Figure 2:
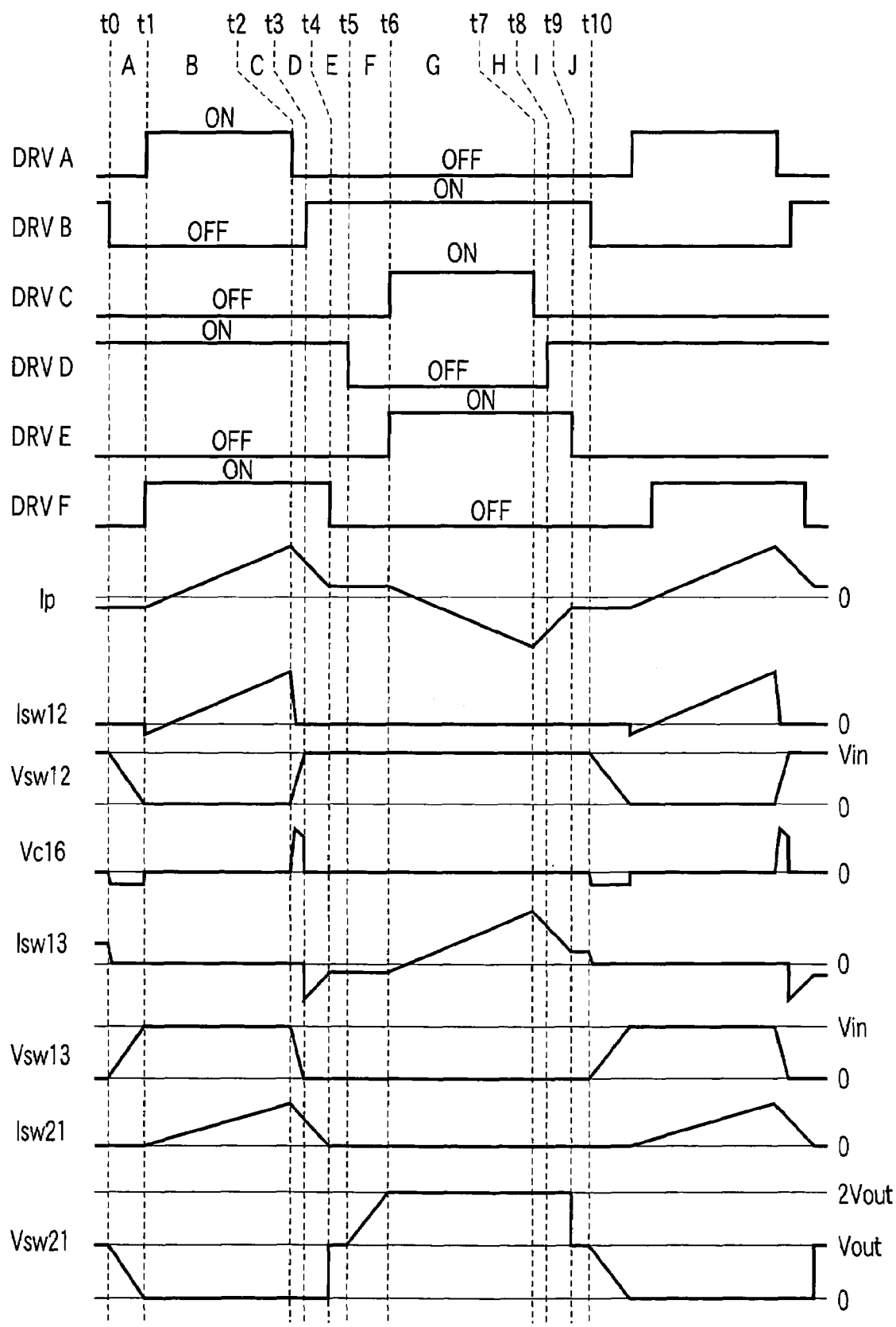
FIG. 2 is a view explaining an operation waveform of each part of the DC-DC converter of the embodiment.

FIG. 2 shows an operation waveform of each part in a circuit diagram shown in FIG. 1. In the meantime, for simplicity, the voltage drop in each of the switching element (12 to 14, 20, 21), the transformer (19), and the coil (18) is ignored.

In FIG. 2, a DRV A denotes a drive signal of the switching element (12), a DRV B denotes a drive signal of the switching element (13), a DRV C denotes a drive signal of the switching element (14), a DRV D denotes a drive signal of the switching element (15), a DRV E denotes a drive signal of the switching element (20), a DRV F denotes a drive signal of the switching element (21), an Ip denotes a current flowing through the primary coil (26) of the transformer (19), an Isw12 denotes a current flowing through the switching element (12), a Vsw12 denotes a voltage applied to the switching element (12), a Vc16 denotes a voltage applied to the capacitor (16), an Isw13 denotes a current flowing through the switching element (13), a Vsw13 denotes a voltage applied to the switching element (13), an Isw21 denotes a current flowing through the switching element (21), and a Vsw21 denotes a voltage applied to the switching element (21), respectively.

First, a period of time when the drive signals DRV A, DRV B, DRV C, DRV D, DRV E, and DRV F of the respective switching elements (12 to 14, 20, 21) are off, off, off, on, off, and off respectively (namely, a period from t0 to t1) is defined as a state A.

In this case, the current flowing through the primary coil (26) is an exciting current content of the transformer (19). The current flows from the transformer (19) through the coil (18), the capacitor (16), the voltage source (10), and the switching element (15) to discharge the electric charge accumulated in the capacitor (16). The current Ip(t9) flowing through the primary coil (26) in this time is found by $$Ip(t9) = -Vout \cdot (t9-t6)/(2 \cdot n \cdot Lp) [A]$$

In this case, Vout [V] denotes an output voltage; n denotes a turn ratio 1:n between the primary coil (26) and the secondary coil (27); and Lp[H] denotes an inductance of the primary coil (26) of the transformer (19).

In addition, at an initial value (t0) of the state A, the end-to-end voltage of the switching element (13) is 0 [V]. Therefore, the switching element (13) is performing the zero voltage switching operation. The secondary side of the transformer (19) is in a state that negative energy is supplied from the capacitor (22).

Next, a period of time when the drive signals DRV A, DRV B, DRV C, DRV D, DRV E, and DRV F of the respective switching elements (12 to 14, 20, 21) are on, off, off, on, off, and on respectively (namely, a period from t1 to t2) is defined as a state B.

The current flows from the voltage source (10) through the switching element (12), the coil (18), the transformer (19), and the switching element (15), respectively. The current Ip flowing through the primary coil (26) of the transformer (19) begins to increase from an initial value Ip(t1)

$$Ip(t1) = Ip(t9) [A]$$

with a slope of $$\{(Vin-Vout/n)/L + Vout/(n \cdot Lp)\} [A/s]$$

and reaches a final value Ip(t2)

$$Ip(t2) = \{(Vin-Vout/n)/L + Vout/(2 \cdot n \cdot Lp)\}(t2-t1) - Ip(t9) [A].$$

In this case, Vin[V] denotes an input voltage, and L[H] denotes an inductance of the coil (18). At the initial value (t1) of the state B, the end-to-end voltage of the switching element (12) is 0 [V]. Therefore, the switching element (12) is performing the zero voltage switching operation.

In the same way, the end-to-end voltage of the switching element (21) is 0 [V]. Therefore, the switching element (21) is performing the zero voltage switching operation. In addition, the secondary side of the transformer (19) is in a state that the energy is supplied from the voltage source (10) at the primary side via the switching element (21).

Next, a period of time when the drive signals DRV A, DRV B, DRV C, DRV D, DRV E, and DRV F of the respective switching elements (12 to 14, 20, 21) are off, off, off, on, off, and on respectively (namely, a period from t2 to t3) is defined as a state C.

The current flows from the coil (18) via the transformer (19), the switching element (15), the voltage source (10), and the capacitor (16) to charge the electric charge to the capacitor (16). Since the end-to-end voltage of the switching element (12) increases moderately due to charging of the capacitor (16) at the initial value (t2) of the state C, the switching loss is small.

The switching loss Psw(12) of the switching element (12) can be schematically represented by the following equation.

$$Psw(12) = Ip(t2)^2 \cdot tr^2 / (6 \cdot Cr \cdot Ts) [W]$$

Here, Cr[F] denotes a capacitance of the capacitor (16), tr[s] denotes a switching period of time of the switching element (12), and Ts[s] denotes a switching period of the DC-DC converter (100) (in FIG. 1, a period of time from t0 to t10).

Next, a period of time where the drive signals DRV A, DRV B, DRV C, DRV D, DRV E, and DRV F of the respective switching elements (12 to 14, 20, 21) are off, on, off, on, off, and on respectively (namely, a period from t3 to t4) is defined as a state D.

The current flows from the coil (18) via the transformer (19), the switching element (15), and the switching element (13). At the initial value (t3) of the state D, the end-to-end voltage of the switching element (13) is 0 [V]. Therefore, the switching element (13) is performing the zero voltage switching operation.

During a period of time of the state C and the state D, the current flowing through the primary side of the transformer (19) begins to increase from an initial value Ip(t2) with a slope of $$\{-Vout/(n \cdot L) + Vout/(n \cdot Lp)\} [A/s]$$

and reaches a final value Ip(t4).

$$Ip(t4) = Vout \cdot (t4 - t1)/(2 \cdot n \cdot Lp) [A]$$

The secondary side of the transformer (19) is in a state that the energy is supplied from the coil (18) at the primary side via the switching element (21).

Next, a period of time when the drive signals DRV A, DRV B, DRV C, DRV D, DRV E, and DRV F of the respective switching elements (12 to 14, 20, 21) are off, on, off, on, off, and off respectively (namely, a period from t4 to t5) is defined as a state E.

In this case, the current flowing through the primary side is the exciting current content of the transformer (19). The current flows from the transformer (19) through the switching element (15), the switching element (13), and the coil (18). The current Ip flowing through the primary side of the transformer (19) is Ip(t4).

The switching loss Psw(12) of the switching element (21) generated at the initial value (t4) of the state E can be schematically represented by the following equation.

$$Psw(12) = 1/6 \cdot Irr \cdot Vout \cdot trr/2 \cdot fsw [W]$$

Here, Irr[A] denotes a recovery current of the switching element (12) and trr[s] denotes a recovery time of the switching element (12).

The recovery current and the recovery time depend on a current slope (−dI/dt) of the switching element and the larger the current slop is, the more the recovery current and the recovery time are increase and the more the switching loss increases.

The current slop of the present embodiment is found as follows.

$$-dI/dt = Vo/(L \cdot n^2) [A/s]$$

This current slop depends on the stabilized output voltage and the large inductance of the coil (18), consequently the current slope of the present embodiment is smaller than that of the normal DC-DC converter.

In addition, since the voltage also becomes the stabilized output voltage, the switching loss is smaller than that of the normal DC-DC converter.

Further, the highest voltage Vp(12) applied to the switching element (12) is found by $$Vp(12) = 2 \cdot Vout$$

and the output voltage is stabilized. Therefore, the withstand pressure of the switching element can be held low and the switching element with a lower resistance can be used, consequently the efficiency of the converter can be increased.

in order to realize the above-described features, the converter is necessarily operated in a discontinuous current mode (DCM). The condition thereof is represented as follows:

$$L < Vout \cdot \{n \cdot Vin\} - Vout\} \cdot Ts / \{4(n \cdot Vin) \cdot Iout\}$$

Here, Iout[A] is the output current.

Next, a period of time when the drive signals DRV A, DRV B, DRV C, DRV D, DRV E, and DRV F of the respective switching elements (12 to 14, 20, 21) are off, on, off, off, off, and off respectively (namely, a period from t5 to t6) is defined as a state F.

A period of time when the drive signals DRV A, DRV B, DRV C, DRV D, DRV E, and DRV F of the respective switching elements (12 to 14, 20, 21) are off, on, on, off, on, and off respectively (namely, a period from t6 to t7) is defined as a state G.

A period of time when the drive signals DRV A, DRV B, DRV C, DRV D, DRV E, and DRV F of the respective switching elements (12 to 14, 20, 21) are off, on, off, off, on, and off respectively (namely, a period from t7 to t8) is defined as a state H.

A period of time when the drive signals DRV A, DRV B, DRV C, DRV D, DRV E, and DRV F of the respective switching elements (12 to 14, 20, 21) are off, on, off, on, on, and off respectively (namely, a period from t8 to t9) is defined as a state I.

A period of time when the drive signals DRV A, DRV B, DRV C, DRV D, DRV E, and DRV F of the respective switching elements (12 to 14, 20, 21) are off, on, off, on, off, and off respectively (namely, a period from t9 to t10) is defined as a state J.

Here, in the states F to J, the same operations as the states A to E are carried out with the direction of the current in the states A to E reversed. Then, the states A to J are repeatedly carried out.

The output voltage Vout according to the present embodiment is represented by the following equation.

$$Vout=Ton^2 \cdot (n \cdot Vin)^2 / \{2 \cdot Iout \cdot (L \cdot n^2) \cdot Ts + (n \cdot Vin) \cdot Ton^2\}$$

where Ton [s] denotes an on-period of the switching elements (12, 14), namely, the period of time from t1 to t2 and the period of time from t6 to t7 in FIG. 2.

Thereby, by changing a time proportion D (=Ton/Ts) or a frequency Ts, the output voltage Vout can be varied. Then, by monitoring the output voltage Vout and performing a pulse width modulation (PWM), a pulse frequency modulation (PFM) or a phase modulation in accordance with the output voltage level, the stabilized voltage can be generated.

According to the above-described embodiment, by arranging two pairs of the switching elements (12 and 14, 13 and 15) at the primary side of the transformer (19), on and off controlling each pair while shifting the phase of each pair by 180 degrees, and making a certain off period, the zero voltage switching can be realized.

Thus, by operating the converter in the discontinuous current mode (DCM), the voltage applied to the secondary side of the transformer (19) becomes a half of the output voltage Vout, consequently the FET with a low withstand pressure can be used and the slope of the current can be suppressed to realize the high efficiency.

In the meantime, the capacitors (16, 17) may be connected to the switching elements (13, 15) in parallel.

Figure 3:
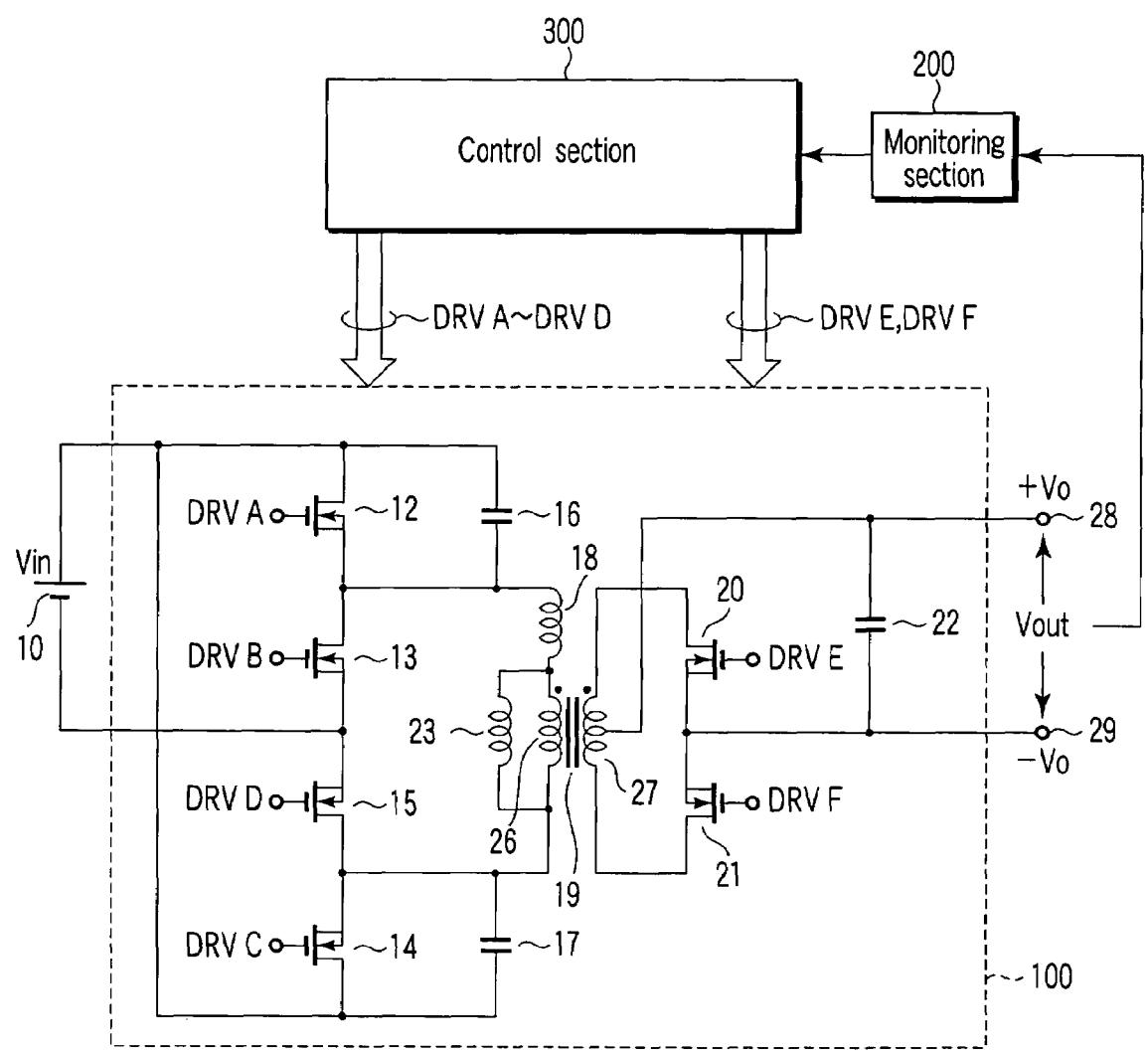
FIG. 3 is a block diagram illustrating a modified example of the DC-DC converter of the embodiment.
Figure 4:
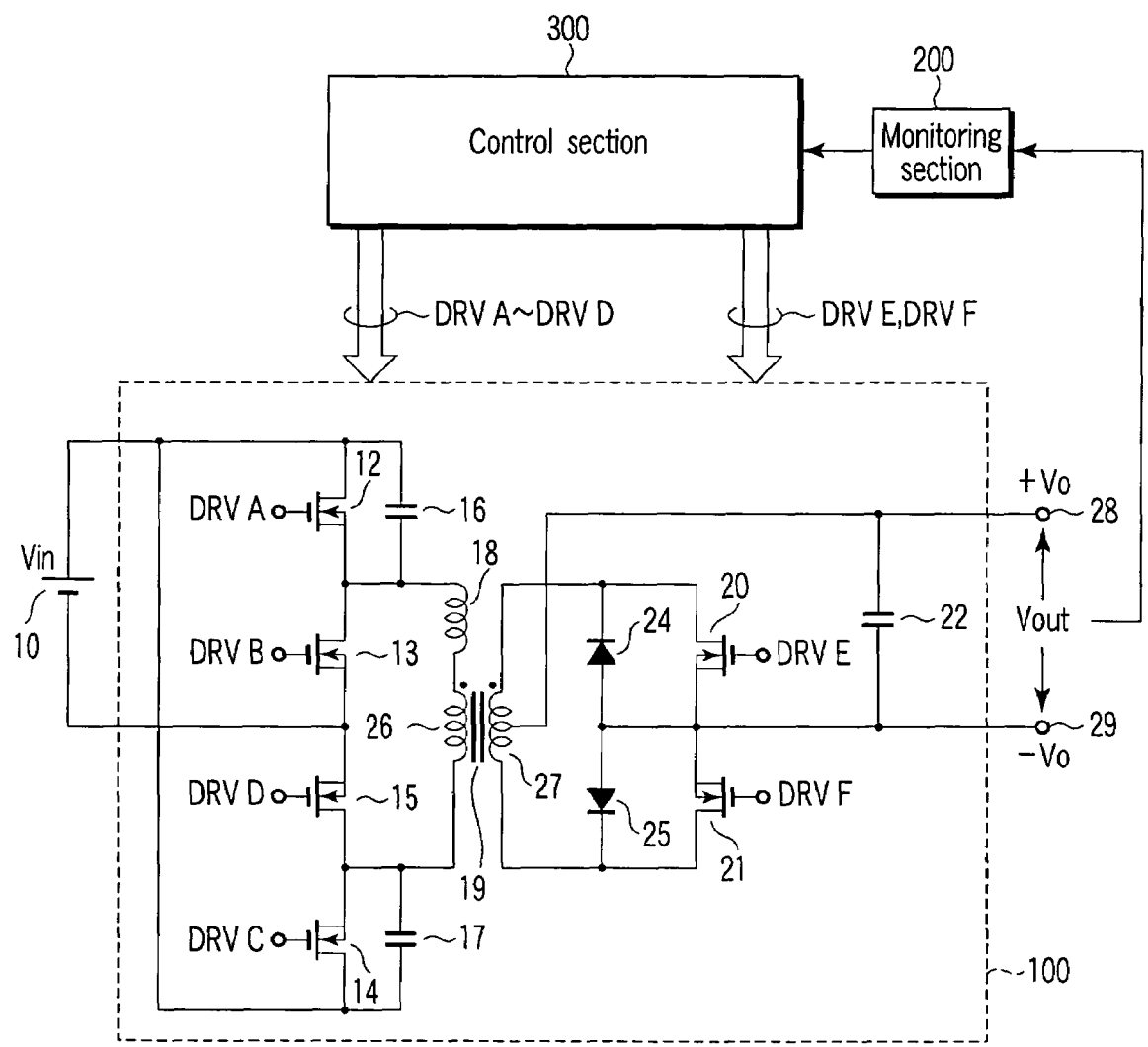
FIG. 4 is a block diagram illustrating another modified example of the DC-DC converter of the embodiment.
Figure 5:
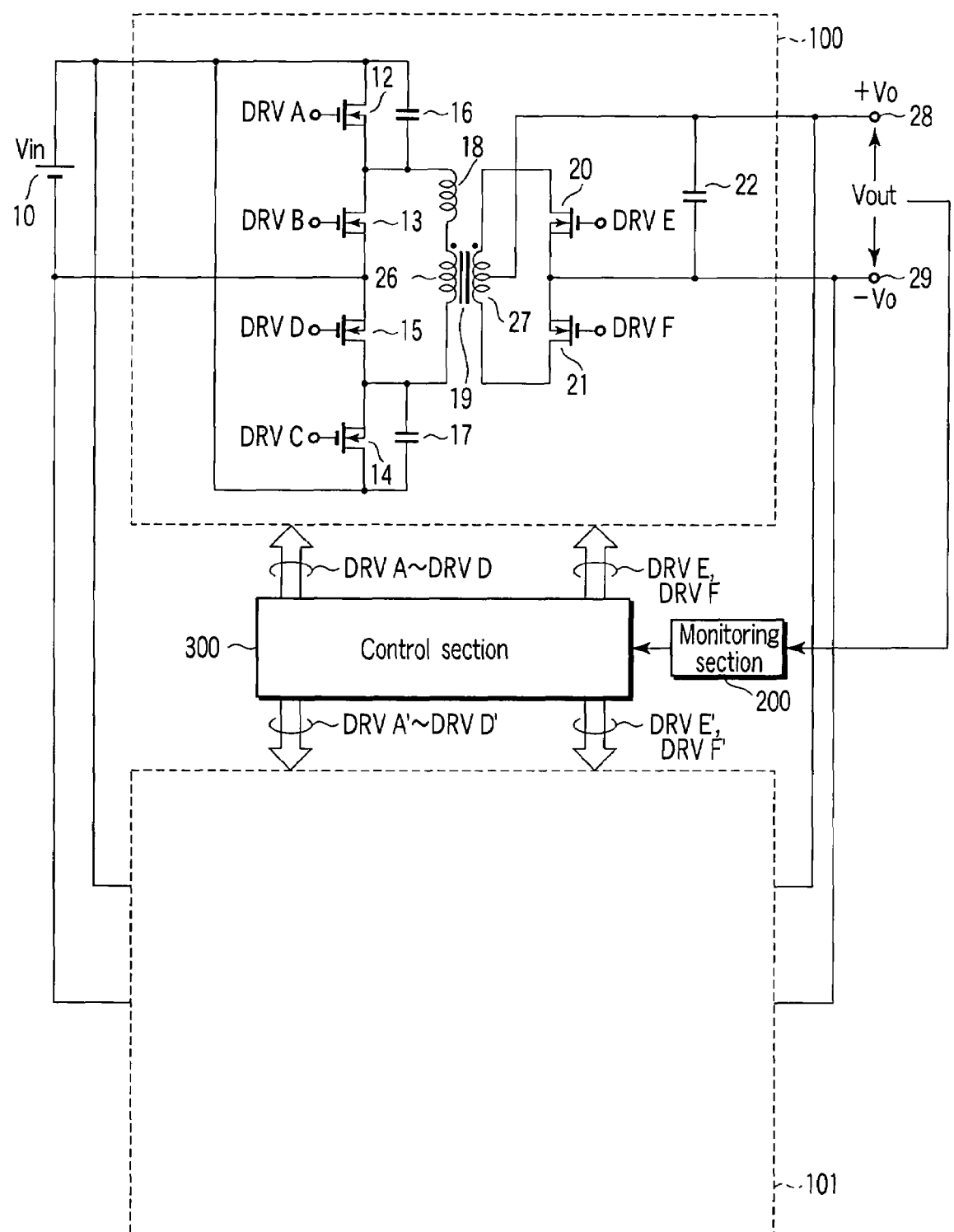
FIG. 5 is a block diagram illustrating the still other modified example of the DC-DC converter of the embodiment.

FIGS. 3 to 5 show the modified examples of the above-described embodiment respectively. First, in FIG. 3, in order to make the control of a dead time easy, a coil (23) is connected to the primary coil (26) of the transformer (19) in parallel.

In FIG. 4, in order to decrease the switching loss, a diode (24) is connected to the switching element (20) at the secondary side in parallel as illustrated polar character and a diode (25) is connected to the switching element (21) in the illustrated polar character in parallel.

Further, in FIG. 5, the DC-DC converter (100) and a DC-DC converter (101) having the same configuration as this DC-DC converter (100) are connected to the voltage source (10) and the output terminals (28, 29) in parallel.

Then, the control section (300) generates DRV A to DRV F as the drive signals of each of the switching elements (12 to 14, 20, 21) of the DC-DC converter (100) and also generates DRV A' to DRV F' as the drive signals of each corresponding switching element (not illustrated) of the DC-DC converter (101). In this case, the drive signals DRV A' to DRV F' are acquired by shifting the phases of the drive signals DRV A to DRV F by 90 degrees.

Thus, by realizing a multiphase using a plurality of DC-DC converters (100, 101), a ripple current of the input capacitor, the ripple current of the output capacitor, and the output ripple voltage can be improved.

In addition, in FIG. 5, it is obvious that the modified examples shown in FIGS. 3 and 4 can be applied to each DC-DC converter (100, 101).

In the meantime, the present invention is not limited to the above-described embodiment as it is and in an execution phase, the component parts of the present invention can be variously modified and specified within a range not shifting from a spirit thereof. Further, by appropriately combining a plurality of component parts disclosed in the above-described embodiment, various inventions can be made. For example, some component parts may be deleted from the all component parts disclosed in the embodiment. In addition, the component parts according to the different embodiments may be appropriately combined.

What is claimed is:

1. An electric power unit, comprising:
    a first switching element having one end to which one level of a direct current voltage is applied;
    a second switching element having one end connected to the other end of the first switching element and having the other end to which the other level of the direct current voltage is applied;
    a third switching element having one end to which one level of the direct current voltage is applied;
    a fourth switching element having one end connected to the other end of the third switching element and having the other end connected to the other end of the second switching element, the other level of the direct current being applied to the other end;
    a first capacitor connected to any one of the first and second switching elements in parallel;
    a second capacitor connected to any one of the third and fourth switching elements in parallel in accordance with the first capacitor;
    a first coil having one end connected to a connection point of the first and second switching elements;
    a transformer having a primary coil connected between the other end of the first coil and the connection point of the third and fourth switching elements;
    fifth and sixth switching elements connected in series between the both ends of a secondary coil of the transformer;
    a third capacitor connected between a middle tap point of the secondary coil of the transformer and the connection point of the fifth and sixth switching elements; and
    a control section which controls the first to sixth switching elements on the basis of the output voltage between the both ends of the third capacitor, wherein there is no period of time when any of the first and second switching elements and the third and fourth switching elements is turned on in a certain switching frequency, any one switching element is turned on in a period of time except for a dead time period for a zero voltage switching, the first and third switching elements and the second and fourth switching elements are turned on and off while shifting phases by 180 degrees, and the fifth and sixth switching elements are turned on during a period of time when currents in a positive direction and an inverse direction are flowing to the output, respectively, and to be operated in a discontinuous current mode, and
    satisfying $$Vout=Ton^2 \bullet (n \bullet Vin)^2 / \{2 \bullet Iout \bullet (L \bullet n^2) \bullet Ts + (n \bullet Vin) \bullet Ton^2\}$$

wherein Vout is output voltage of the electric power unit, Ton is an on-period of the first and third switching elements, n is a turn ratio 1:n between the primary coil and the secondary coil, Vin is the direct current voltage, Iout is output current of the electric power unit, L is an inductance of the first coil, and Ts is a switching period of a circuit of the first, second, third, fourth, fifth, and sixth switching elements, the first, second, and third capacitors, the first coil, and the transformer.

2. An electric power unit, comprising:
    first and second DC-DC converters connected in parallel, each having: a first switching element having one end to which one level of a direct current voltage is applied; a second switching element having one end connected to the other end of the first switching element and having the other end to which an other level of the direct current voltage is applied; a third switching element having one end to which one level of the direct current voltage is applied; a fourth switching element having one end connected to the other end of the third switching element and having the other end connected to the other end of the second switching element, the other level of the direct current being applied to the other end; a first capacitor connected to any one of the first and second switching elements in parallel; a second capacitor connected to any one of the third and fourth switching elements in parallel in accordance with the first capacitor; a first coil having one end connected to a connection point of the first and second switching elements; a transformer having a primary coil connected between the other end of the first coil and a connection point of the third and fourth switching elements; fifth and sixth switching elements connected in series between the both ends of the secondary coil of the transformer; and a third capacitor connected between a middle tap point of the secondary coil of the transformer and a connection point of the fifth and sixth switching elements; and a control section which controls the first to sixth switching elements of the first and second DC-DC converters on the basis of multiphased output voltages of the first and second DC-DC converters, wherein there is no period of time when any of the first and second switching elements and the third and fourth switching elements is turned on in a certain switching frequency, any one switching element is turned on in a period of time except for a dead time period for zero voltage switching, the first and third switching elements and the second and fourth switching elements are turned on and off while shifting the phases by 180 degrees, and the fifth and sixth switching elements are turned on during a period of time when currents in a positive direction and an inverse direction are flowing to the output, respectively, to be operated in a discontinuous current mode, and further, the control section shifts phases of the signals for on and off control of the first to sixth switching elements by 90 degrees between the first and second DC-DC converters, and satisfying $$Vout = Ton^2 \cdot (n \cdot Vin)^2 / \{2 \cdot Iout \cdot (L \cdot n^2) \cdot Ts + (n \cdot Vin) \cdot Ton^2\}$$

wherein Vout is an output voltage of at least one of the first and second DC-DC converters, Ton is an on-period of the first and third switching elements, n is a turn ratio 1:n between the primary coil and the secondary coil, Vin is the direct current voltage, Iout is an output current of the at least one of the first and second DC-DC converters, L is an inductance of the first coil, and Ts is a switching period of the at least one of the first and second DC-DC converters.

* * * * *